United States Patent [19]

Dierkes et al.

[11] Patent Number: 5,139,059
[45] Date of Patent: Aug. 18, 1992

[54] DEVICE FOR FILLING A PLURALITY OF CONTAINERS

[75] Inventors: Martin Dierkes, Gross-Zimmern; Manfred Gartner, Darmstadt, both of Fed. Rep. of Germany

[73] Assignee: Dohler GmbH, Darmstadt, Fed. Rep. of Germany

[21] Appl. No.: 716,111

[22] Filed: Jun. 17, 1991

[30] Foreign Application Priority Data

Apr. 16, 1991 [DE] Fed. Rep. of Germany ... 9104641[U]

[51] Int. Cl.⁵ .............................................. B65B 3/06
[52] U.S. Cl. .................................. 141/237; 141/244; 141/247; 141/375
[58] Field of Search ............... 141/237, 242, 243, 244, 141/245, 238, 239, 240, 241, 247, 375, 363-366

[56] References Cited

U.S. PATENT DOCUMENTS

| 1,790,626 | 1/1931 | Menninger et al. | 141/237 X |
| 2,019,877 | 11/1935 | Thomas | 141/246 |
| 2,027,830 | 1/1936 | Krein | 141/237 |
| 2,720,351 | 10/1955 | Fleischer et al. | 141/246 |
| 3,566,929 | 3/1971 | Mead | 141/237 |
| 3,664,387 | 5/1972 | Cates, Jr. | 141/238 |
| 3,693,673 | 9/1972 | Oates | 141/237 |
| 3,732,903 | 5/1973 | Oates | 141/237 |
| 4,972,886 | 11/1990 | Bernstein | 141/98 |

FOREIGN PATENT DOCUMENTS 2453076 12/1980 France .................. 141/237

Primary Examiner—Ernest G. Cusick
Attorney, Agent, or Firm—Wegner, Cantor, Mueller & Player

[57] ABSTRACT

A device for simultaneously filling a plurality of prefabricated cup-like containers having the same height with creamy food compositions, said device consisting of an outer frame which is higher than the upper edge of the containers, and of a cover plate which has a plurality of round openings (wells) conforming to the maximum diameter of the containers, said wells carrying tubular downward extensions which are longer by at least 3 mm, and preferably by 10 mm, than the difference between the height of the containers and the height of the frame.

7 Claims, 2 Drawing Sheets

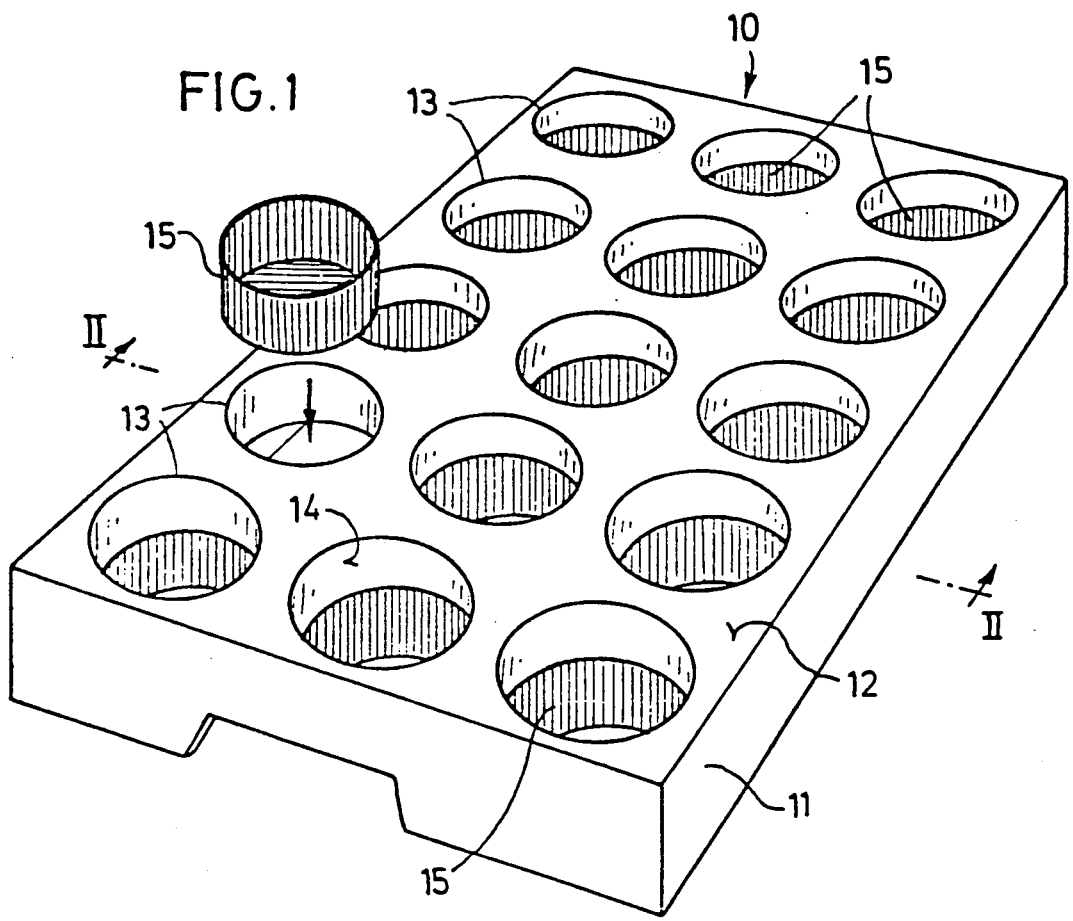
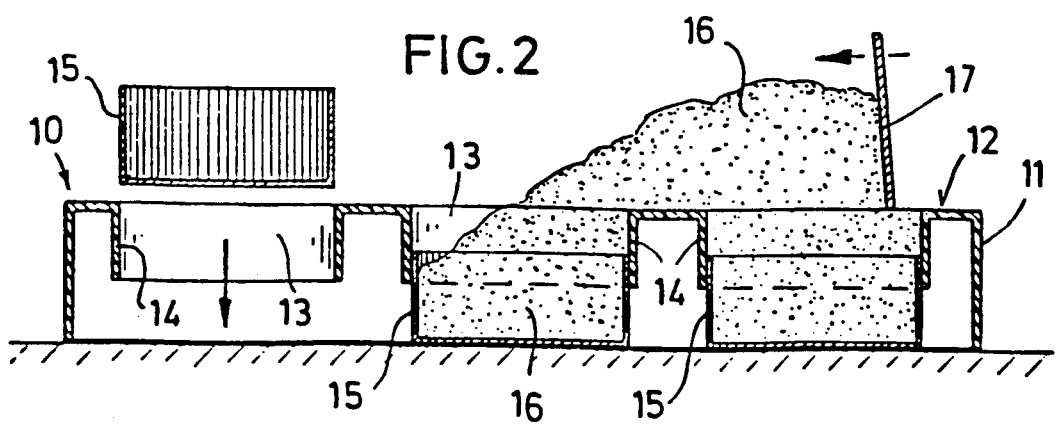

DEVICE FOR FILLING A PLURALITY OF CONTAINERS

BACKGROUND OF THE INVENTION

The present invention relates to a device for simultaneously filling a plurality of pre-fabricated cup-like containers having the same height with creamy food compositions. These cup-like containers consist of either hard chocolate or appropriately pre-shaped aluminum foil. Typical containers of such type have a flat bottom with a diameter of about 60 mm. The side wall of about 30 mm in height is mostly conically widened towards the top and, thus, at the upper edge has a diameter of about 70 mm. Said containers are designed to be filled with creamy food compositions to serve as dessert or tart pieces. So far, such containers were filled by hand, which operation required considerable skill. A considerable amount of time was required for filling such containers.

SUMMARY OF THE INVENTION

It is the object of the invention to provide a device for simultaneously filling a plurality of pre-fabricated cup-like containers having the same height with creamy food compositions, whereby the time consumption is reduced and less manual skill is necessary to conduct the filling operation so that the final product is unobjectionable and of good appearance. It was another object to allow the filling step to be effected in a way that the fill mix even exceeds the outer edge, so that the filling is readily recognizable from the part protruding over the edge. However, then this part is required to look especially attractive and homogeneous. It was a further object to provide such a device which meets the hygienic requirements, is easy to clean and may be readily stored until further use.

BRIEF DESCRIPTION OF THE DRAWINGS

The device of the invention is illustrated in greater detail in the attached Figures, in which:

FIG. 1 is a perspective view of the device;

FIG. 2 is a sectional view along the line II—II in FIG. 1;

DETAILED DESCRIPTION OF THE PREFERRED EMBODIMENTS

Figure 3:
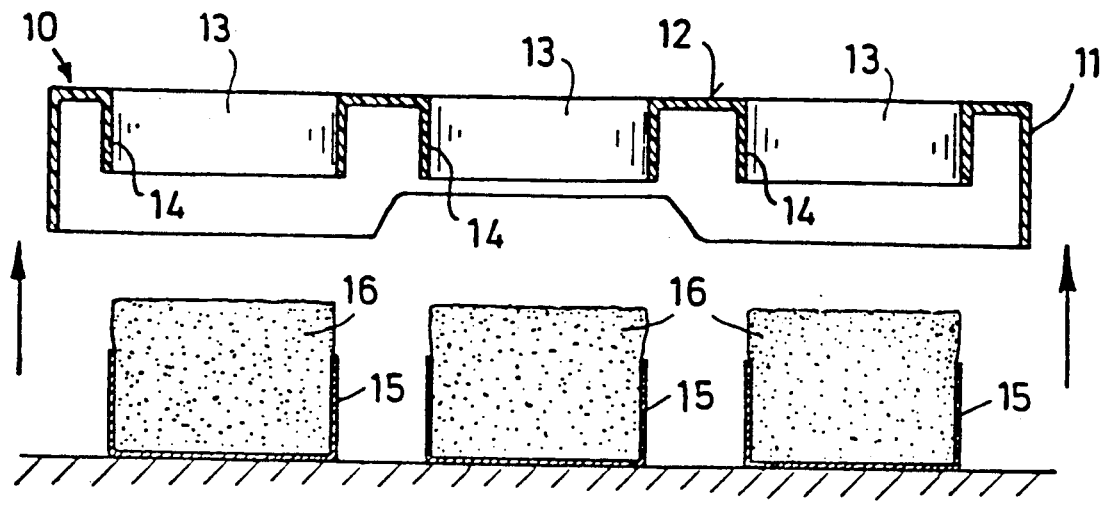
FIG. 3 is a sectional view of the device after it has been upwardly withdrawn.
Figure 4:
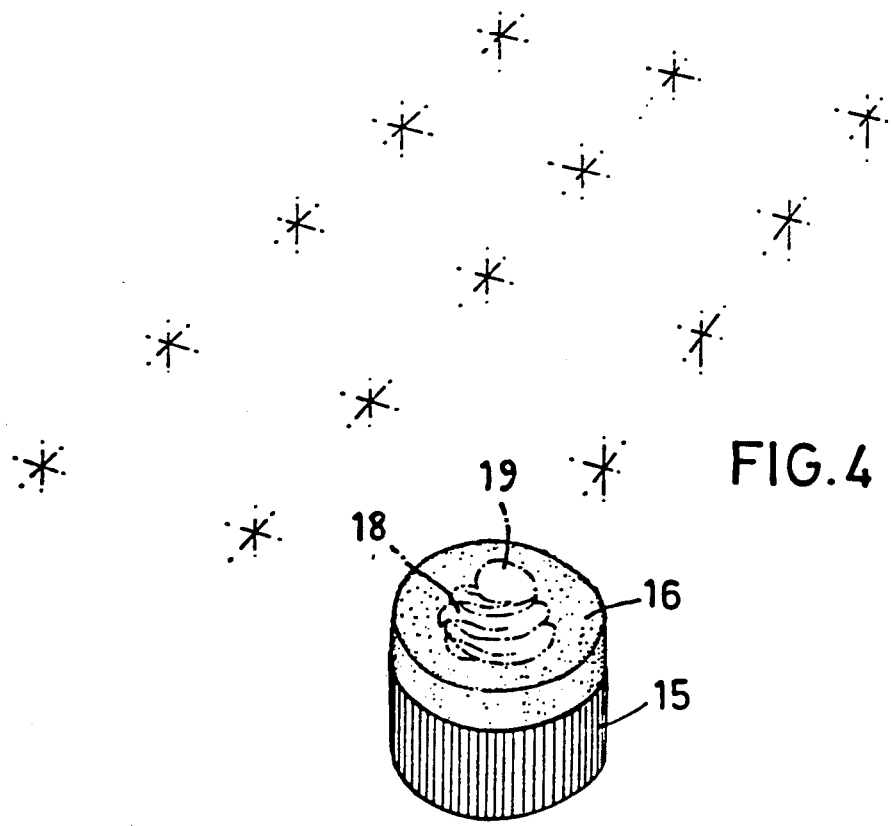
FIG. 4 is a diagram of the finished products, one of which has been shown in greater detail.

The objects of the invention have been attained in a surprisingly simple manner by means of a device 10 which comprises an outer frame 11 which is higher than the upper edge of the containers 15, and a cover plate 12 which has a plurality of round openings or wells 13 conforming to the maximum diameter of the containers 15, said wells extending downward in tubular extensions, which extensions are longer by at least 3 mm, and preferably by 10 mm, than the difference between the height of the containers and the height of the frame.

In a preferred embodiment, the entire device, i.e. the frame 11, the cover plate 12 and the tubular extensions 14 are integrally formed by an injection molding process from thermoplastic synthetic materials.

The device may of course be provided in various sizes. For example, for the case of smaller requirements there may be provided a device carrying only 6 wells. If larger amounts of the same kind are to be processed, the device may also comprise 36 wells. For a normal use a device comprising 3 times 5=15 wells has proven to be well suitable.

In the usually used containers which are about 70 mm wide and about 30 mm high, the height of the frame should be about 40 mm. Then, the tubular extensions should have a length of about 20 mm. For containers having other sizes there may, of course, be chosen other dimensions for the height of the frame and of the tubular extensions.

The device of the invention is used in such a manner that the pre-fabricated containers 15 are inserted in the wells 13 and then the creamy food composition 16 is forced into the containers 15 by means of a spatula 17. After all of the excess of creamy composition has been removed by means of the spatula 17, the device is taken off by lifting it up (FIG. 3), so that the containers 15 with the filling smoothly and neatly protruding over the top edge thereof are left sitting intact. These, if desired, may then be still garnished and decorated with sprayed whipped cream or a sprayed cream 18. Into the latter, in turn, there may be inserted further decorative items such as fruits, mocha chocolate beans and other chocolates 19.

Thus, the dessert or tart portions are quickly and simply preparable and may be immediately used. If aluminum containers are used, the final products may also be frozen and thawed shortly before use. If hard chocolate is used as the container, it is not recommended to subsequently freeze the composition, since thereby hard chocolate would become too hard and fragile.

What is claimed is:

1. A device for simultaneously filling a plurality of prefabricated cup-like containers with a creamy food filling, said containers each having essentially the same height as each other container, said device comprising:
   an outer frame having a height greater than that of the containers; and
   means coupled to said outer frame for forming an evenly formed mass of creamy filling extending above each container, said means including:
   a cover plate adapted to removably cover the containers;
   a plurality of round wells formed in said cover plate, each of said wells conforming to the maximum diameter of the containers; and
   a tubular downward extension extending from each of said wells, each of said tubular downward extensions being at least 3 mm longer than the difference between the height of the containers and the height of the frame so that, when said cover plate is placed over said containers, said tubular downward extensions surround a portion of an outer circumference of the corresponding container.

2. A device according to claim 1, wherein the tubular downward extension is at least 10 mm longer than the difference between the height of the containers and the height of the frame.

3. The device according to claim 2, wherein said cover plate is rectangular in shape and comprises from 6 to 36 wells.

4. A device according to claim 1, wherein the frame, the cover plate and the tubular downward extensions have been integrally formed by an injection molding process from thermoplastic synthetic materials.

5. The device according to claim 1, wherein the containers used are about 70 mm wide and about 30 mm high, the height of the frame is about 40 mm and the tubular extensions have a length of about 20 mm.

6. The device according to claim 5, wherein said cover plate is rectangular in shape and comprises from 6 to 36 wells.

7. The device according to claim 1, wherein said cover plate is rectangular in shape and comprises from 6 to 36 wells.

* * * * *